(12) United States Patent
Im et al.

(10) Patent No.: US 9,897,842 B2
(45) Date of Patent: Feb. 20, 2018

(54) DISPLAY DEVICE AND MANUFACTURING METHOD THEREOF

(71) Applicant: Samsung Display Co., Ltd., Yongin-Si, Gyeonggi-Do (KR)

(72) Inventors: Hyun Deok Im, Seoul (KR); Dae Hyun Kim, Hwaseong-si (KR); Hyun Min Cho, Seoul (KR); Jae Byung Park, Seoul (KR)

(73) Assignee: Samsung Display Co., Ltd. (KR)

( * ) Notice: Subject to any disclaimer, the term of this patent is extended or adjusted under 35 U.S.C. 154(b) by 167 days.

(21) Appl. No.: 14/968,628

(22) Filed: Dec. 14, 2015

(65) Prior Publication Data

US 2016/0216549 A1 Jul. 28, 2016

(30) Foreign Application Priority Data

Jan. 28, 2015 (KR) .......................... 10-2015-0013775

(51) Int. Cl.
| | | |
|---|---|---|
| *G02F 1/136* | (2006.01) | |
| *G02F 1/1333* | (2006.01) | |
| *G02F 1/1335* | (2006.01) | |
| *G02F 1/1341* | (2006.01) | |
| *G02F 1/1362* | (2006.01) | |

(52) U.S. Cl.
CPC ...... *G02F 1/133377* (2013.01); *G02F 1/1341* (2013.01); *G02F 1/133526* (2013.01); *G02F 1/133553* (2013.01); *G02F 2001/136222* (2013.01)

(58) Field of Classification Search
CPC ............ G02F 1/133377; G02F 1/1368; G02F 1/133553; G02F 1/133526; G02F 1/1341; G02F 1/13439; G02F 1/133345
See application file for complete search history.

(56) References Cited

U.S. PATENT DOCUMENTS

| | | | |
|---|---|---|---|
| 6,864,931 B1 | 3/2005 | Kumar et al. | |
| 2002/0001053 A1 | 1/2002 | Nakao et al. | |
| 2014/0285760 A1* | 9/2014 | Song | G02F 1/133711 349/124 |
| 2014/0300853 A1* | 10/2014 | Kim | G02F 1/134336 349/144 |
| 2014/0362329 A1* | 12/2014 | Lee | G02F 1/1341 349/86 |

FOREIGN PATENT DOCUMENTS

| | | |
|---|---|---|
| KR | 10-0825105 | 4/2008 |
| KR | 2008-0088164 | 10/2008 |
| KR | 2012-0026880 | 3/2012 |
| KR | 2013-0126396 | 11/2013 |

* cited by examiner

*Primary Examiner* — Hoan C Nguyen
(74) *Attorney, Agent, or Firm* — Innovation Counsel LLP

(57) ABSTRACT

Provided is a display device including: an insulation substrate; a thin film transistor disposed on the substrate; a pixel electrode disposed on the thin film transistor; a roof layer formed to be spaced apart from the pixel electrode with a microcavity therebetween and including a support member; and a liquid crystal layer filling the microcavity, in which the microcavity includes a plurality of microcavities having a semicircular cross section arranged along an extending direction of the gate line and extending in the extending direction of the data line.

12 Claims, 24 Drawing Sheets

DISPLAY DEVICE AND MANUFACTURING METHOD THEREOF

CROSS-REFERENCE TO RELATED APPLICATION

This application claims priority to and the benefit of Korean Patent Application No. 10-2015-0013775 filed in the Korean Intellectual Property Office on Jan. 28, 2015, the entire contents of which are incorporated herein by reference.

BACKGROUND (a) Field

The present inventive concept relates to a display device and a manufacturing method thereof.

(b) Description of the Related Art

A liquid crystal display which is one of the most common types of flat panel displays currently in use, includes two display panels with field generating electrodes such as a pixel electrode and a common electrode, and a liquid crystal layer interposed therebetween. The liquid crystal display generates an electric field in the liquid crystal layer by applying a voltage to the field generating electrodes to determine alignment of liquid crystal molecules of the liquid crystal layer through the generated electric field and control polarization of incident light, thereby displaying images.

The two display panels configuring the liquid crystal display may include a thin film transistor array panel and an opposing display panel. In the thin film transistor array panel, a gate line transferring a gate signal and a data line transferring a data signal are formed to cross each other, and a thin film transistor connected with the gate line and the data line, a pixel electrode connected with the thin film transistor, and the like may be formed. In the opposing display panel, a light blocking member, a color filter, a common electrode, and the like may be formed. In some cases, the light blocking member, the color filter, and the common electrode may be formed on the thin film transistor array panel.

However, in a liquid crystal display in the related art, two sheets of substrates are necessarily used, and respective constituent elements are formed on the two sheets of substrates, and as a result, there are problems in that the display device is heavy and thick, has high cost, and has a long processing time.

The above information disclosed in this Background section is only for enhancement of understanding of the background of the inventive concept and therefore it may contain information that does not form the prior art.

SUMMARY

The present inventive concept has been made in an effort to provide a display device and a manufacturing method thereof having advantages of reducing a weight, a thickness, cost, and a processing time by manufacturing the display device by using one substrate.

Further, the present inventive concept has been made in an effort to provide a display device and a manufacturing method thereof having advantages of solving a problem of a difference in color sense of an image at a front view and a side view by modifying a shape of a microcavity.

An exemplary embodiment of the present inventive concept provides a display device including: an insulation substrate; a thin film transistor disposed on the substrate; a pixel electrode disposed on the thin film transistor; a roof layer formed to be spaced apart from the pixel electrode with a microcavity therebetween and including a support member; and a liquid crystal layer filling the microcavity, in which the microcavity has a semicircular cross section arranged along an extending direction of the gate line and includes a plurality of microcavities extending in the extending direction of the data line.

The plurality of microcavities are not connected with adjacent microcavities.

In the plurality of microcavities, a ratio of a height and a width of each microcavity is about 1:2 to about 1:3.

A height of each of the plurality of microcavities is about 3 μm to about 5 μm.

A width of each of the plurality of microcavities is about 6 μm to about 15 μm.

The display device may further include color filters formed between the thin film transistor and the pixel electrode, in which the color filters of red, green, blue, and white may be alternately formed with respect to each pixel electrode.

The microcavity disposed on the pixel electrode with the red, green, and blue color filters has a single space separated for each pixel electrode and has a quadrangular cross section, and the microcavity including the plurality of microcavities having a semicircular cross section is a white subpixel.

The display device further includes a reflective layer having a plurality of openings corresponding to centers of the plurality of microcavities disposed on a surface of the insulation substrate.

The display device further includes a plurality of lenses having a same width as each of the plurality of microcavities disposed on a lower surface of the insulation substrate.

A cross section in the gate line direction of the microcavity may have a linear shape connecting a plurality of semicircular shapes spaced apart from each other and adjacent curved surfaces are connected by a flat surface disposed between the adjacent curved surfaces.

The microcavity has a single space in the one pixel electrode.

The display device further includes a reflective layer having a plurality of openings corresponding to a center of a region where each semicircular shape is formed, the reflective layer being disposed on a surface of the insulation substrate.

Another exemplary embodiment of the present inventive concept provides a manufacturing method of a display device including: forming a thin film transistor on a substrate; forming a first insulating layer on the thin film transistor; forming a pixel electrode connected with the thin film transistor on the first insulating layer; forming a sacrificial layer on the pixel electrode; forming a roof layer on the sacrificial layer; forming a liquid crystal injection hole and exposing the sacrificial layer by patterning the roof layer; forming a microcavity between the pixel electrode and the roof layer by removing the sacrificial layer; forming an alignment layer by injecting an alignment layer material into the microcavity; forming a liquid crystal layer by injecting a liquid crystal material into the microcavity; and sealing the microcavity by forming an overcoat on the roof layer, in which the sacrificial layer has a semicircular cross section arranged along an extending direction of the gate line and a semi-cylindrical shape extending in an extending direction of a data line Between the forming of the thin film transistor on the substrate and the forming of the first insulating layer on the thin film transistor, the manufacturing method may further include forming a common electrode on the thin film transistor.

A height of each of the plurality of microcavities is about 3 μm to about 5 μm.

A width of each of the plurality of microcavities is about 6 μm to about 15 μm.

Before the forming of the thin film transistor on the substrate, the manufacturing method may further include forming a reflective layer on the substrate, in which the reflective layer has a plurality of openings corresponding to a center of a region where each semicircular shape is formed.

The method further includes forming a lens on the surface of the substrate opposite to a surface in which the reflective layer is formed. The lens has a same width as each of the plurality of microcavities.

Before the forming of the thin film transistor on the substrate, the manufacturing method may further include forming a lens on a lower surface of the substrate, in which the lens has a same width as each of the plurality of microcavities.

A cross section in the gate line direction of the sacrificial layer formed in the forming of the sacrificial layer on the pixel electrode has a plurality of semicircular shaped regions spaced apart from each other and adjacent curved surfaces are connected by a flat surface region disposed between the adjacent curved surfaces.

According to the exemplary embodiment of the present inventive concept, it is possible to solve a problem of a difference in color sense of an image at a front view and a side view.

DETAILED DESCRIPTION OF THE EMBODIMENTS

Figure 1:
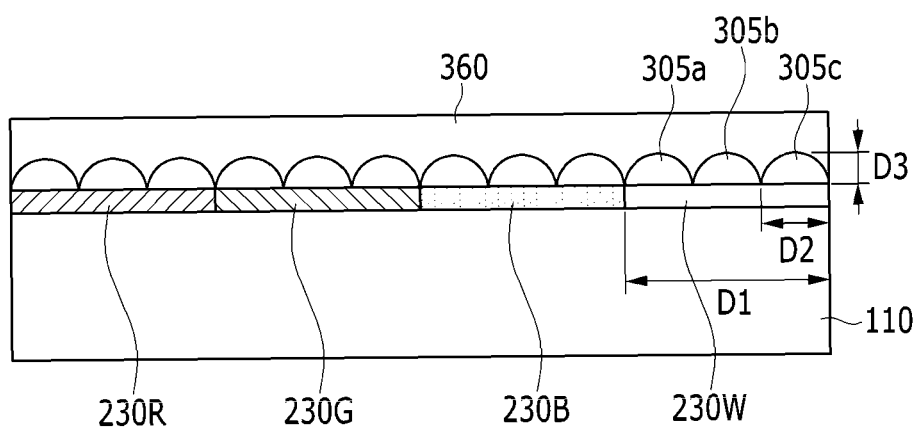
FIG. 1 is a cross-sectional view schematically illustrating a display device according to an exemplary embodiment of the present inventive concept.

The present inventive concept will be described more fully hereinafter with reference to the accompanying drawings, in which exemplary embodiments of the inventive concept are illustrated. As those skilled in the art would realize, the described embodiments may be modified in various different ways, all without departing from the spirit or scope of the present inventive concept.

In the drawings, the thicknesses of layers, films, panels, regions, and the like, are exaggerated for clarity. Like reference numerals designate like elements throughout the specification. It will be understood that when an element such as a layer, film, region, or substrate is referred to as being "on" another element, it can be directly on the other element or intervening elements may also be present between the element and the another element. In contrast, when an element is referred to as being "directly on" another element, there are no intervening elements present.

Hereinafter, a display device according to an exemplary embodiment of the present inventive concept will be described in detail with reference to the accompanying drawings.

FIG. 1 is a cross-sectional view schematically illustrating a display device according to an exemplary embodiment of the present inventive concept. Referring to FIG. 1, the liquid crystal display according to the exemplary embodiment of the present inventive concept includes a substrate 110, a color filter 230 (230R, 230G and 230B) formed on the substrate, a microcavity 305 (305a, 305b and 305c) formed on the color filter, a liquid crystal layer filling the microcavity, and a roof layer 360 formed on the microcavity.

The color filters include red, green, blue, and white color filters, and although not illustrated, a pixel electrode and a common electrode spaced apart from the pixel electrode are formed on the color filters.

A kind of color filter is formed on one pixel electrode, and a plurality of microcavities which has a hemispherical cross section in a horizontal direction and a semi-cylindrical shape in which the hemisphere extends in a vertical direction is formed.

A liquid crystal layer is injected into the microcavity.

Although described below in detail, the shape of the microcavity uniformizes a light path passing through the liquid crystal layer. Accordingly, a problem such as a difference in color sense when viewed from a front and a side of the display device is solved.

Hereinabove, main components of the present inventive concept are briefly described, and next, the liquid crystal display of the present inventive concept will be hereinafter described with reference to detailed drawings.

Figure 2:
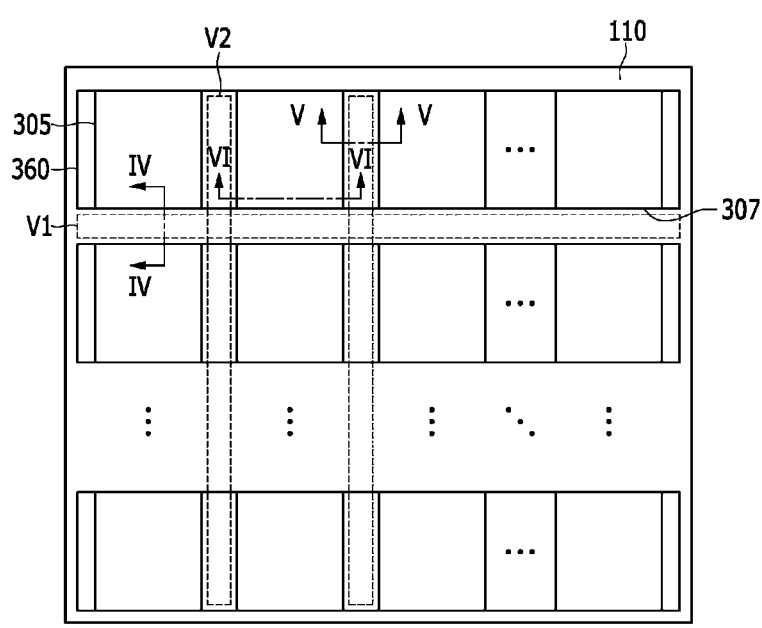
FIG. 2 is a plan view illustrating the display device according to the exemplary embodiment of the present inventive concept.

FIG. 2 is a plan view illustrating the display device according to the exemplary embodiment of the present inventive concept.

The display device according to the exemplary embodiment of the present inventive concept includes a substrate 110 made of a material such as glass or plastic.

A microcavity 305 covered by a roof layer 360 is formed on the substrate 110. The roof layers 360 extend in a row direction, and a plurality of microcavities 305 is formed below one roof layer 360.

The microcavities 305 may be disposed in a matrix form, first valleys V1 are positioned between the microcavities 305 adjacent in a column direction, and second valleys V2 are positioned between the microcavities 305 adjacent in a row direction.

Although described below, a thin film transistor and the like are formed in the first valley, which is referred to as a thin film transistor formation region. Further, a partition wall covering the side of the microcavity by the roof layer 360 is formed in the second valley, and the second valley is referred to as a partition wall formation region.

The plurality of roof layers 360 are separated from each other with the first valleys V1 therebetween. The microcavity 305 is not covered by the roof layer 360, but may be exposed outside at the first valley V1. This is called an injection hole 307. The injection hole 307 is formed at one edge of the microcavity 305.

Each roof layer 360 is formed to be separated from the substrate 110 between the adjacent second valleys V2 to form the microcavity 305. That is, the roof layer 360 is formed to cover the rest of sides except for the side of a first edge in which the injection hole 307 is formed. Accordingly, the roof layer 360 includes a side wall having three surfaces except for the first edge side and an upper surface covering the side wall. In this case, the side positioned at the edge facing the injection hole 307 may be a horizontal support member, and the side positioned at the edge connected with the horizontal support member to form a side wall may be a vertical support member.

The structure of the display device according to the exemplary embodiment of the present inventive concept described above is just an example, and may be variously modified. For example, the layout form of the microcavities 305, the first valleys V1, and the second valleys V2 may be modified, and the plurality of roof layers 360 may be connected to each other in the first valleys V1, and a part of each roof layer 360 is formed to be separated from the substrate 110 in the second valley V2 and thus the adjacent microcavities 305 may be connected to each other.

Figure 3:
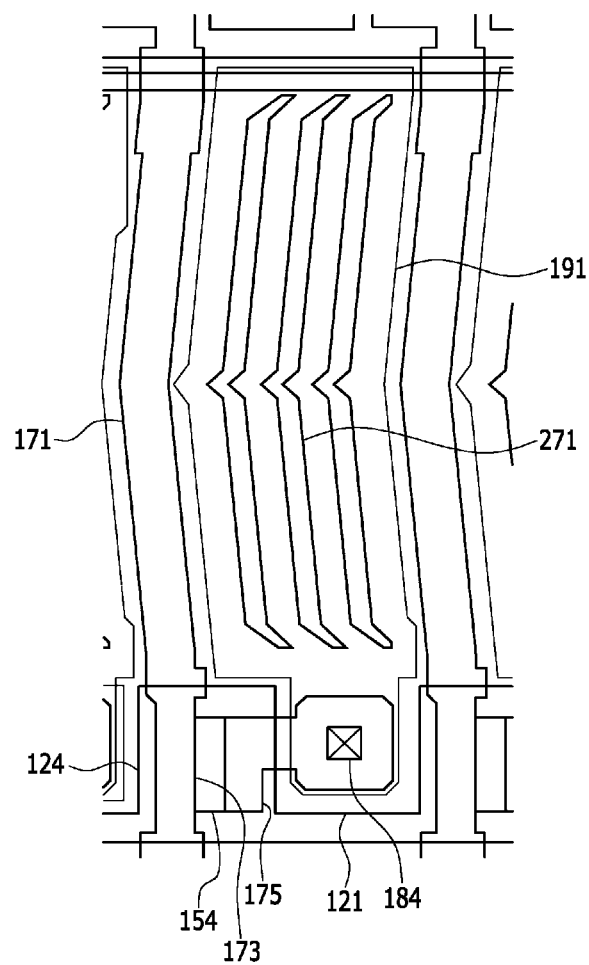
FIG. 3 is a diagram illustrating one pixel in the display device according to the exemplary embodiment of the present inventive concept.
Figure 4:
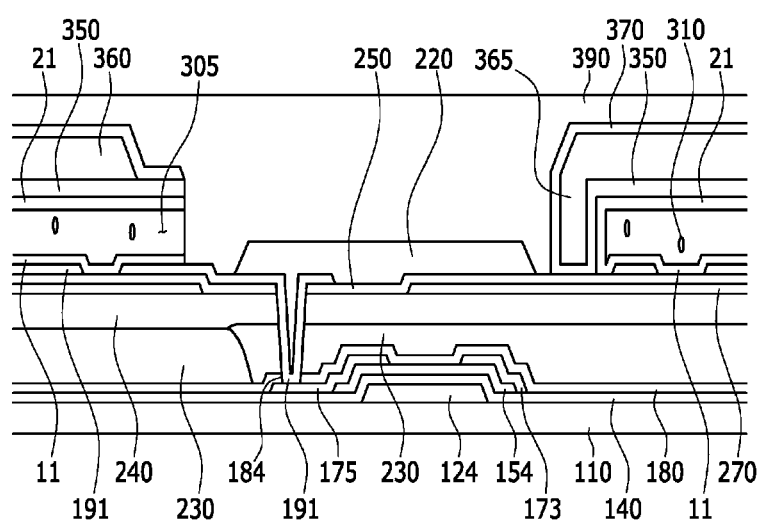
FIG. 4 is a cross-sectional view of the display device of FIG. 2 taken along line IV-IV.
Figure 5:
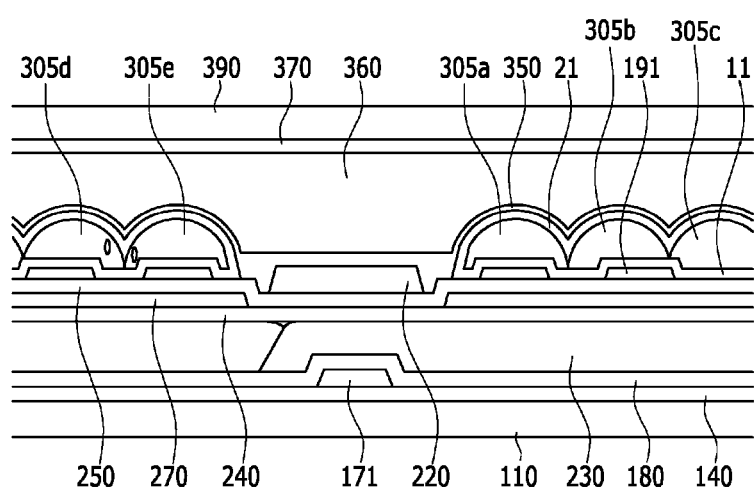
FIG. 5 is a cross-sectional view of the display device of FIG. 2 taken along line V-V.
Figure 6:
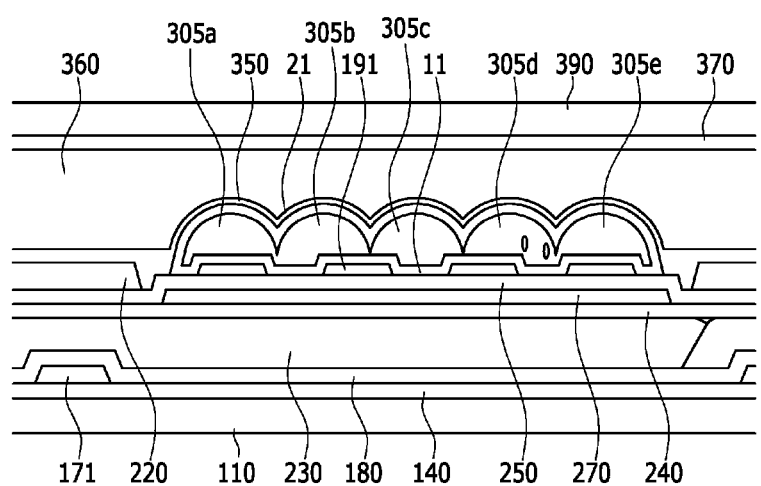
FIG. 6 is a cross-sectional view illustrating the display device of FIG. 2 taken along line VI-VI.

Hereinafter, the display device according to the exemplary embodiment of the present inventive concept will be described with reference to FIGS. 3 to 6. FIG. 3 illustrates one pixel in the display device according to the exemplary embodiment of the present inventive concept. FIG. 4 is a cross-sectional view of the display device of FIG. 2 taken along line IV-IV. FIG. 5 is a cross-sectional view of the display device of FIG. 2 taken along line V-V. FIG. 6 is a cross-sectional view illustrating the display device of FIG. 2 taken along line VI-VI.

First, a gate conductor including a gate line 121 is formed on an insulation substrate 110 made of transparent glass, plastic, or the like.

The gate line 121 includes a gate electrode 124 and a wide end portion (not illustrated) for connecting with other layers or an external driving circuit. The gate line 121 may be made of aluminum-based metal such as aluminum (Al) or an aluminum alloy, silver-based metal such as silver (Ag) or a silver alloy, copper-based metal such as copper (Cu) or a copper alloy, molybdenum-based metal such as molybdenum (Mo) or a molybdenum alloy, chromium (Cr), tantalum (Ta), titanium (Ti), and the like.

However, the gate line 121 may have a multilayered structure including at least two conductive layers having different physical properties.

A gate insulating layer 140 made of silicon nitride (SiNx), silicon oxide (SiOx), or the like is formed on the gate line 121. The gate insulating layer 140 may have a multilayered structure including at least two insulating layers having different physical properties.

A semiconductor 154 made of amorphous silicon or polysilicon is formed on the gate insulating layer 140. The semiconductor 154 may include an oxide semiconductor.

An ohmic contact layer (not illustrated) is formed on the semiconductor 154. The ohmic contact layer (not illustrated) may be made of a material such as n+ hydrogenated amorphous silicon in which an n-type impurity such as phosphorus is doped at a high concentration, or silicide. The ohmic contact layer (not illustrated) may be disposed on the semiconductor 154 and including two ohmic contact layers spaced apart each other with an intervening channel layer. In the case where semiconductor 154 is an oxide semiconductor, the ohmic contacts may be omitted.

A data conductor including a data line 171 which includes a source electrode 173 and a drain electrode 175 is formed on the semiconductor 154 and the gate insulating layer 140.

The data line 171 includes a wide end portion (not illustrated) for connecting with another layer or an external driving circuit. The data line 171 transfers a data signal and mainly extends in a vertical direction to cross the gate line 121.

In this case, the data line 171 may have a first curved portion having a curved shape in order to acquire maximum transmittance of the liquid crystal display, and the curved portions meet each other in a middle region of a pixel area to have a V-lettered shape. A second curved portion (not shown) which is curved to form a predetermined angle with the first curved portion may be further included in the middle region of the pixel area.

The first curved portion of the data line 171 may be curved to form an angle of about 7° with a vertical reference line which forms an angle of 90° in an extending direction of the gate line 121. The second curved portion disposed in the middle region of the pixel area may be further curved to form an angle of about 7° to about 15° with the first curved portion.

The source electrode 173 may be a part of the data line 171. The drain electrode 175 is formed to extend in parallel with the source electrode 173. Accordingly, the drain electrode 175 is parallel with the part of the data line 171.

The gate electrode 124, the source electrode 173, and the drain electrode 175 form a thin film transistor (TFT) together with the semiconductor 154, and a channel of the thin film transistor is formed in the semiconductor 154 between the source electrode 173 and the drain electrode 175.

The display device according to the exemplary embodiment of the present inventive concept includes the source electrode 173 and the drain electrode 175 extending in parallel with the data line 171. As a result, a width of the thin film transistor may be increased while an area occupied by the data conductor is not increased, thereby increasing an aperture ratio of the display device.

However, in the case of a display device according to another exemplary embodiment of the present inventive concept, the source electrode 173 and the drain electrode 175 may be modified to have different shapes.

The data line 171 and the drain electrode 175 may be made of refractory metal such as molybdenum, chromium, tantalum, and titanium or an alloy thereof, and may have a multilayered structure including a refractory metal layer (not illustrated) and a low resistive conductive layer (not illustrated). An example of the multilayered structure may include a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer. However, the data line 171 and the drain electrode 175 may be made of various metals or conductors other than the metals.

A passivation layer 180 is disposed on the data conductor 171, 173, and 175, the gate insulating layer 140, and an exposed portion of the semiconductor 154. The passivation layer 180 may be made of an inorganic insulating material or an organic insulating material.

A color filter 230 in each pixel area PX is formed on the passivation layer 180. Each color filter 230 may display one of the primary colors such as three primary colors of red, green and blue. The color filter 230 is not limited to the three primary colors of red, green and blue, but may display one of cyan, magenta, yellow, and white-based colors. Unlike those illustrated above, the color filter 230 may be elongated in a column direction between the adjacent data lines 171.

An organic layer 240 is disposed on the color filter 230. The organic layer 240 has a thickness larger than that of the passivation layer 180 and may have a flat surface.

The organic layer 240 is disposed in the display area where the plurality of pixels is positioned, but may not be disposed in the peripheral area where the gate pad portion or the data pad portion is formed. Further, the organic layer 240 may be disposed even in the peripheral area where the gate pad portion or the data pad portion is formed.

The organic layer 240, the color filter 230, and the passivation layer 180 have contact holes 184.

A common electrode 270 is disposed on the organic layer 240. The common electrode 270 may have a planar shape, and is disposed in the display area where the plurality of pixels is positioned, but is not be disposed in the peripheral area where the gate pad portion or the data pad portion is formed.

The common electrode 270 may be formed of a transparent conductive layer such as ITO or IZO.

An insulating layer 250 is disposed on the common electrode 270. The insulating layer 250 may be made of an inorganic insulating material such as silicon nitride (SiNx), silicon oxide (SiOx), and silicon oxynitride (SiOxNy). The insulating layer 250 serves to protect the color filter 230 made of the organic material and the like and insulate the common electrode 270 and the pixel electrode 191 from each other. That is, even though the common electrode 270 is formed to overlap with the pixel electrode 191, the insulating layer 250 formed on the common electrode 270 prevents the common electrode 270 from being contacting the pixel electrode 191 thereby preventing short-circuit between the pixel electrode 191 and the common electrode 270.

The pixel electrode 191 is disposed on the insulating layer 250. The pixel electrode 191 includes curved edges which are substantially parallel with the first curved portion and the second curved portion of the data line 171.

The pixel electrode 191 may be formed of a transparent conductive layer such as ITO or IZO.

The pixel electrode 191 is physically and electrically connected to the drain electrode 175 through the contact holes 184 formed in the organic layer 240, the color filter 230, and the passivation layer 180 to receive a voltage from the drain electrode 175.

The pixel electrode 191 receives a data voltage from the drain electrode 175, and the common electrode 270 receives a reference voltage having a predetermined magnitude from a reference voltage applying unit disposed outside the display area.

The pixel electrode 191 and the common electrode 270 generate an electric field by applying the voltages, and the liquid crystal molecules of the liquid crystal layer 310 disposed between the two electrodes 191 and 270 rotate in a direction parallel to the direction of the electric field. Polarization of light passing through the liquid crystal layer varies according to the rotation directions of the liquid crystal molecules determined as described above.

A lower insulating layer 350 may be further formed on the pixel electrode 191 so as to be spaced apart from the pixel electrode 191 at a predetermined distance. The lower insulating layer 350 may be made of an inorganic insulating material such as silicon nitride (SiNx) and silicon oxide (SiOx). The lower insulating layer 350 is formed so that semi-circular shapes are repeated along the upper surface of the microcavity.

The microcavity 305 is formed between the pixel electrode 191 and the lower insulating layer 350. That is, the microcavity 305 is surrounded by the pixel electrode 191 and the lower insulating layer 350.

Referring to FIGS. 3, 4, and 5, in one pixel, a plurality of microcavities 305 (305*a*, 306*b*, 306*c*, 305*d* and 305*e*) having semicircular cross sections is formed in a parallel direction with the gate line 121.

The microcavity 305 has a semicircular cross section in the gate line direction and a semi-cylindrical shape extending in the data line direction, in which a cut surface of a circle faces the substrate.

According to a cross section in a parallel direction to the data line of FIG. 3, the microcavity 305 has a predetermined height in one pixel area.

However, referring to FIGS. 4 and 5, in one pixel area corresponding to one pixel electrode, the plurality of microcavities having the semicircular cross sections is formed. The respective microcavities are separated from the adjacent microcavities. The microcavity has a semi-oval cross section close to a semi-circular shape or a circular shape.

The microcavities having semi-cylindrical cross sections are disposed in one pixel area. The cut surfaces of the semi-cylindrical micro cavities face the substrate.

In FIGS. 4 and 5, only five microcavities are disposed in one pixel area, but this is schematically illustrated and actually tens of microcavities may be formed in one pixel area.

Figure 7:
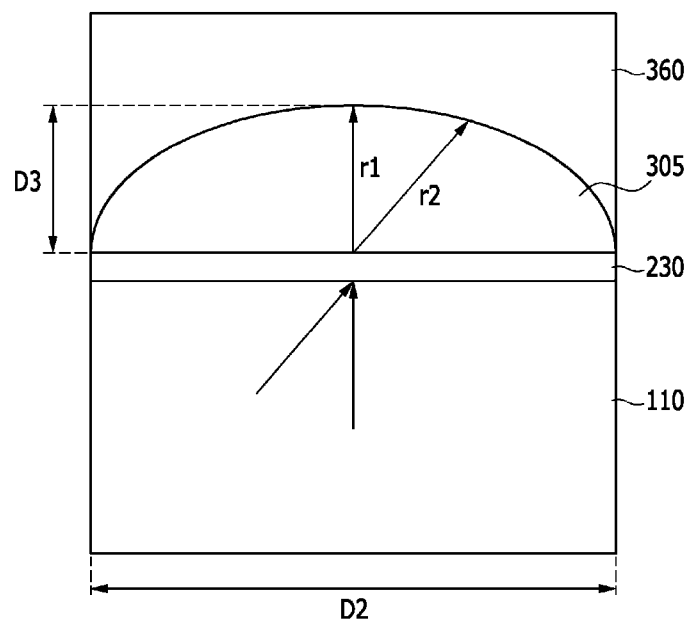
FIG. 7 is a diagram illustrating one microcavity in the display device according to the exemplary embodiment of the present inventive concept.

FIG. 7 illustrates one microcavity in the display device according to the exemplary embodiment of the present inventive concept. Referring to FIG. 7, the shape and the role of one microcavity among the plurality of microcavities will be described below. It is apparent that the description of the microcavity in this embodiment of the present inventive concept may be applied even to microcavities in the other embodiment of the present inventive concept.

Referring to FIG. 7, in the display device according to the exemplary embodiment of the present inventive concept, the microcavity has a semicircular cross section which includes semioval cross section.

Accordingly, the light incident from the lower panel passes through a same length of the liquid crystal layer filling the microcavity is similar.

When the microcavity has a quadrangular cross sectional shape, a length of light passing through the center of the microcavity and a length of light passing through an edge of the microcavity is different from each other.

The length of the light passing through the edge of the microcavity is much longer than that of the light passing through the center of the microcavity. Thus, a color sense at a side view and a front view may be different from each other. That is, since the length of the light passing through the edge of the microcavity which is a length of the light passing through the liquid crystal when viewed at the side of the panel is longer than that of the light passing through the center of the microcavity which is a length of the light passing through the liquid crystal layer when viewed at the front, there are problems in that transmittance of incident light is different at the front and the side, and a yellowish color is censed when viewed at the side.

However, in the display device of the present inventive concept, since the microcavity is formed in the semicircular shape which includes the semioval shape, paths of incident light in the display device when view at the front are the same as or similar to paths of incident light in the display device when viewed at the side.

When the shape of the microcavity is the semicircular shape, the optical paths of the light when viewed at the front are the same as the optical paths of the light when viewed at the side. In the case of the semioval shape, the optical paths of the light when viewed at the front are similar to the optical paths of the light when viewed at the side, thereby improving a difference in color sense between the front view and the side view. In this case, a ratio of a height d3 and a width D2 of one microcavity may be about 1:2 to about 1:3. That is, when the ratio of the height d3 and the width D2 of the microcavity is 1:2, the microcavity has a completely semicircular shape. In this case, the light incident to the center of the microcavity has the same optical path in all the regions, thereby minimizing a difference in color sense between the front view and the side view.

Further, when the ratio of the height d3 and the width D2 of the microcavity is about 1:3, the microcavity has an oval shape. However, even in this case, the difference in the path of light passing through the liquid crystal is largely reduced as compared with the existing quadrangular structure, thereby improving the difference in the color sense between the front view and the side view.

In this case, d3 may be a cell gap of the liquid crystal display. The cell gap may be about 3 µm to about 5 µm The cell gap may have a different value than the above value according to the liquid crystal used in the display device.

D2 may be 6 µm to 15 µm.

Generally, since a size of a horizontal direction (extending direction of the gate line D1) of the pixel electrode is about 60 µm to about 120 µm, about 10 to about 20 microcavities may exist on one pixel electrode. However, the number of microcavities in one pixel may vary according to a size of the pixel, but is not limited thereto.

Referring back to FIGS. 4 to 6, a first alignment layer 11 is disposed on the pixel electrode 191. The first alignment layer 11 may be formed directly on the insulating layer 250 which is not covered by the pixel electrode 191.

A second alignment layer 21 is disposed below the lower insulating layer 350 so as to face the first alignment layer 11.

The first alignment layer 11 and the second alignment layer 21 may be formed by vertical alignment layers, and made of alignment materials such as polyamic acid, polysiloxane, and polyimide. The first and second alignment layers 11 and 21 may be connected to each other at the edge of the pixel area PX as illustrated in FIGS. 4 to 6

A liquid crystal layer including liquid crystal molecules 310 is formed in the microcavity 305 disposed between the pixel electrode 191 and the lower insulating layer 350.

The roof layer 360 is disposed on the lower insulating layer 350. The roof layer 360 may be made of an organic material. The microcavity 305 is formed below the roof layer 360, and the roof layer 360 is hardened by a curing process to maintain the shape of the microcavity 305. The roof layer 360 is formed to be spaced apart from the pixel electrode 191 with the microcavity 305 therebetween.

The roof layers 360 are formed in each pixel area PX and the second valley V2 along a pixel row, but are not formed in the first valley V1. The microcavity 305 is not formed below the roof layer 360 in the second valley V2. Accordingly, a thickness of the roof layer 360 disposed in the second valley V2 may be formed to be larger than that of the roof layer 360 disposed in the pixel area. The upper surface and both sides of the microcavity 305 are formed to be covered by the roof layer 360.

The injection hole 307 exposing a part of the microcavity 307 is formed in the roof layer 360. The lower insulating layer 350 adjacent to the region where the injection hole 307 is formed may include a region which further protrudes than the roof layer 360.

The injection hole 307 according to the exemplary embodiment of the present inventive concept may be formed at one edge of the pixel area PX. For example, the injection hole 307 may be formed corresponds to a lower side of the pixel area PX to expose one surface of the microcavity 305. On the contrary, the injection hole 307 may be formed to correspond to an upper side of the pixel area PX.

Further, the injection hole 307 may be formed at any one of two edges of each microcavity 305 facing each other.

Since the microcavity 305 is exposed by the injection holes 307, an aligning agent, a liquid crystal material, or the like may be injected into the microcavity 305 through the injection holes 307.

A support member 365 is formed at the position facing the injection hole 307 below the roof layer 360, and for example, may be a horizontal support member. That is, when the injection hole 307 is formed to correspond to one edge of the microcavity 305, the support member 365 is positioned at an opposite edge corresponding to one edge.

The microcavity 305 is formed below the roof layer 360, and a phenomenon that the roof layer 360 sags downward at the injection hole 307 at an inlet of the microcavity 305 may occur. In the display device according to the exemplary embodiment of the present inventive concept, since the support member 365 formed at the position corresponding to the injection hole 307 supports the roof layer 360, the sagging phenomenon of the roof layer 360 may be prevented.

The support member 365 is formed at any one of the edges of two different microcavities 305 facing each other. The plurality of microcavities 305 is disposed in a matrix form which includes a plurality of pixel rows and a plurality of pixel columns. For example, the microcavity 305 may have a semicircular shape which includes a semioval shape, and a lower edge of the microcavity 305 in a first row and an upper edge of the microcavity 305 in a second row face each other. In this case, the support member 365 is formed at any one of the lower edge of the microcavity 305 in the first row and the upper edge of the microcavity 305 in the second row which face each other. In the case where the support member 365 is formed at the lower edge of the microcavity 305, the support member 365 is formed at the lower edge even in the microcavity in the second row. The support member 365 may be formed at the upper edge of the microcavity 305 in each row.

In this case, positions where the support member 365 and the injection hole 307 are formed are different from each other. That is, when the injection hole 307 is formed at the edge corresponding to the upper side of the microcavity 305, the support member 365 is formed at the edge corresponding to the lower side of the microcavity and vice versa. When the injection hole 307 is formed at the edge corresponding to the lower side of the microcavity 305, the support member 365 is formed at the edge corresponding to the upper side of the microcavity. Meanwhile, in the region where the injection hole 307 is formed, the insulating layer 250 includes the region which further protrudes than the roof layer 360, but in the region where the support member 365 is formed, ends of the roof layer 360 and the insulating layer 250 may substantially coincide with each other.

The first valley V1 is formed between the microcavities 305 positioned in different rows. When the position of the support member 365 is described based on the first valley V1, the support member 365 is formed to be adjacent to one side of the first valley V1.

The support member 365 is connected with the roof layer 360, and may be made of the same material as the roof layer 360. The lower insulating layer 350 may be positioned below the support member 365.

However, the present inventive concept is not limited thereto, and the support member 365 may be made of a different material from the roof layer 360, and the lower insulating layer 350 may not be positioned below the support member 365. In this case, the support member 365 may be formed directly on the pixel electrode 191.

A planar shape of the support member 365 is illustrated as a quadrangle, but is not limited thereto, and may have various shapes such as a circle and a triangle.

The support member 365 may be aligned with one end of the roof layer as illustrated in FIG. 3. As an example, when the support member 365 is positioned at the upper edge of the microcavity, the upper edge of the roof layer 360 and the edge of the support member 365 may coincide with each other. As a result, the protruding region of the lower insulating layer 350 may be removed as formed in the injection hole 307. When the injection hole 307 region corresponding thereto is described, as illustrated in FIG. 3, it can be seen that the insulating layer 350 further protrudes than the roof layer 360.

Accordingly, like the exemplary embodiment of the present inventive concept, when the roof layer 360 and one end of the support member 365 are coincidentally aligned, the protruding region of the insulating layer and the like are removed, thereby increasing an aperture ratio by the corresponding region or increasing the region where the thin film transistor is positioned. When the area of the region where the thin film transistor is positioned is increased, the liquid crystal may be easily dropped at the injection hole and the dropped liquid crystal may be easily injected into the micro cavity 305.

The upper insulating layer 370 may further formed on the roof layer 360. The upper insulating layer 370 may be made of an inorganic insulating material such as silicon nitride (SiNx) and silicon oxide (SiOx). The upper insulating layer 370 may be formed to cover an upper surface and a side of the roof layer 360. The upper insulating layer 370 serves to protect the roof layer 360 made of an organic material and may be omitted if necessary.

As illustrated in FIG. 3, the upper insulating layer 370 may contact the second insulating layer 350 which further protrudes than the roof layer 360 in the region where the injection hole 307 is positioned. Further, the region contacting the second insulating layer 350 and the region covering the roof layer of the upper insulating layer 370 may have a different height.

Further, the upper insulating layer 370 may be connected with the second insulating layer 350. The upper insulating layer 370 may be connected or overlap with the second insulating layer 350 at an opposite position corresponding to the injection hole 307, that is, in the region where the support member 365 is positioned.

An overcoat 390 may be disposed on the upper insulating layer 370. The overcoat 390 is formed to cover the injection hole 307 exposing a part of the microcavity 305 to the outside. That is, the overcoat 390 may seal the microcavity 305 so as to prevent the liquid crystal molecules 310 formed in the microcavity 305 from being discharged to the outside. Since the overcoat 390 contacts the liquid crystal molecules 310, the overcoat 390 may be made of a material which does not react with liquid crystal molecules 310. For example, the overcoat 390 may be made of parylene and the like.

The overcoat 390 may be formed as a multilayer such as a double layer and a triple layer. The double layer is configured by two layers made of different materials. The triple layer is configured by three layers, and materials of adjacent layers are different from each other. For example, the overcoat 390 may include a layer made of an organic insulating material and a layer made of an inorganic insulating material.

Although not illustrated, polarizers may be further formed on upper and lower surfaces of the display device. The polarizers may include a first polarizer and a second polarizer. The first polarizer may be attached onto the lower surface of the substrate 110, and the second polarizer may be attached onto the overcoat 390.

Next, hereinafter, a display device according to another exemplary embodiment of the present inventive concept will be described with reference to FIGS. 8 to 12. The display device according to the exemplary embodiment illustrated in FIGS. 8 to 12 is similar to the exemplary embodiment described above. The detailed description for like or similar constituent elements will be omitted.

Figure 8:
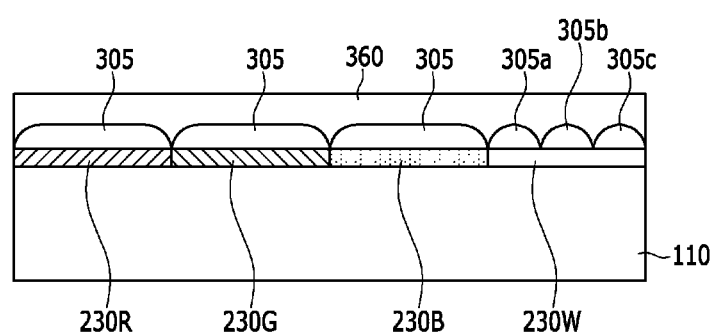
FIG. 8 is a diagram illustrating the display device according to the exemplary embodiment of the present inventive concept.

FIG. 8 illustrates a display device according to another exemplary embodiment of the present inventive concept. Referring to FIG. 8, in the display device according to the exemplary embodiment, a plurality of microcavities having semicircular cross sections is formed only in an upper region of a white color filter among blue, red, green, and white color filters.

That is, a single microcavity having a quadrangular shape generally connected by one is formed on the blue, red, and green color filters, and the plurality of microcavities having the semicircular cross sections is formed only in the white color filter as described above.

This is because in a white region, light of red, green, and blue colors is transmitted at the same time and a change in color sense due to a difference in the path passing through the liquid crystal between the side view and the front view is strongest among the regions.

That is, in a white color filter region, light of three colors is transmitted, and as a result, the change in color sense becomes three times larger than that of the other regions.

Accordingly, since the white color filter region is most influenced by the change in color sense of an image, the plurality of microcavities may be selectively formed only in the white region.

Accordingly, in the display device according to the exemplary embodiment, the manufacturing process may be simplified and a high effect may be obtained.

Next, a display device according to another exemplary embodiment of the present inventive concept will be described with reference to FIGS. 9 and 10.

Figure 9:
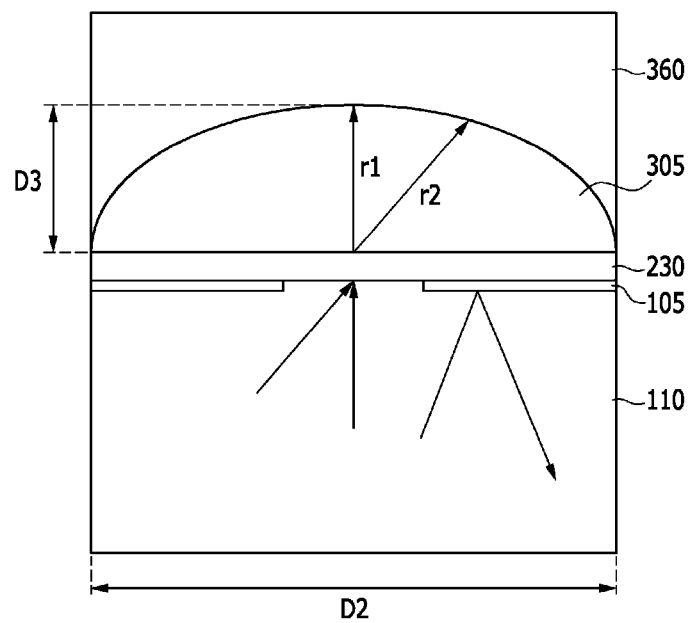
FIG. 9 is a diagram schematically illustrating one microcavity in the display device according to the exemplary embodiment of the present inventive concept.

FIG. 9 schematically illustrates one microcavity in the display device according to the exemplary embodiment of the present inventive concept.

Referring to FIG. 9, a reflective layer 105 is formed between the substrate 110 and the color filter 230. The reflective layer 105 may be made of a reflective metal.

Although not illustrate, an insulating layer insulating adjacent reflective layers may be disposed on the reflective layer 105.

The reflective layers 105 may be disposed at both sides of one microcavity 305, but are not formed at a central region of the microcavity 305.

Accordingly, as illustrated in FIG. 9, light incident from a side region of the microcavity 305 is reflected by the reflective layer 105 and is not incident to the inside of the microcavity 305.

However, the light incident to the center of the microcavity 305 is not reflected by the reflective layer 105 to be input to the inside of the microcavity 305.

The reflective layer 105 reflects the light incident upon an edge direction of the microcavity 305 and transmits only light incident upon a central direction of the microcavity 305. Accordingly, the paths of the light passing through the microcavity 305 are the same as each other.

Even though the microcavity 305 has a semicircular cross section, when the light is incident from an edge of the microcavity 305, the paths of the light passing through the microcavity 305 are not the same as each other.

However, in the display device according to the exemplary embodiment, the light is incident only upon the liquid crystal at the center of the microcavity 305 by forming the reflective layer 105 below the microcavity 305. Accordingly, the paths of the light passing through the microcavity 305 are equalized, thus, preventing the difference in color sense from occurring between the side view and the front view as described above.

Figure 10:
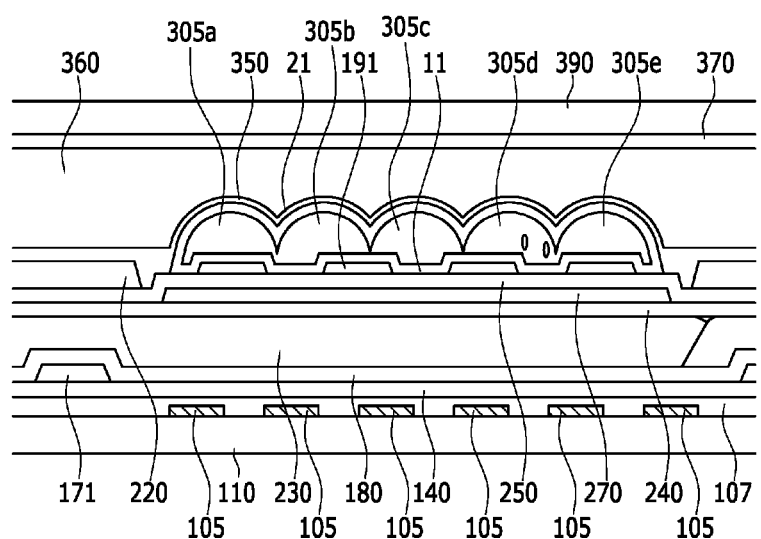
FIG. 10 is a diagram particularly illustrating a cross section of the display device according to the exemplary embodiment of FIG. 9.

FIG. 10 illustrates cross section of the display device according to the exemplary embodiment of FIG. 9. As illustrated in FIG. 10, the reflective layer 105 is formed below each microcavity except for the central region of the each microcavity, and the reflective layer 105 is insulated from the upper gate conductor and the like by an insulating layer 107.

Figure 11:
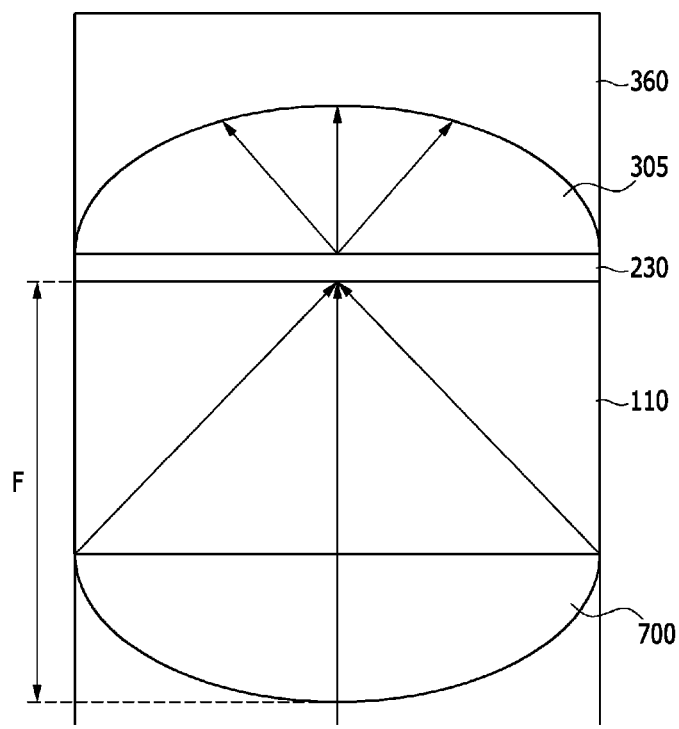
FIG. 11 illustrates a cross section of a display device according to another exemplary embodiment of the present inventive concept.

FIG. 11 illustrates a cross section of the display device according to another exemplary embodiment of the present inventive concept. Referring to FIG. 11, in the display device according to the exemplary embodiment, a convex lens 700 corresponding to the microcavity is formed below the substrate.

As illustrated in FIG. 11, a lens 700 having the same width as the microcavity is formed below the substrate. The convex lens 700 collects the incident light to the central region of the microcavity 305.

Accordingly, the light passing through the microcavity 305 is focused on the center of the microcavity 305, and the paths of light advancing the microcavity 305 are uniformalized.

That is, the display device according to the exemplary embodiment of FIG. 11 has the same effect as the exemplary embodiment illustrated in FIGS. 9 and 10.

However, in the display device according to the exemplary embodiment, since the light is not reflected by the reflective layer 105 and all of the incident light is incident to inside the microcavity 305 through the lens 700, the optical paths may be equally maintained while the efficiency of the display device is not reduced.

The exemplary embodiment illustrated in FIGS. 9 and 10 may further include convex lens to improve efficiency of light by reducing light reflected by the reflective layer 105.

Figure 12:
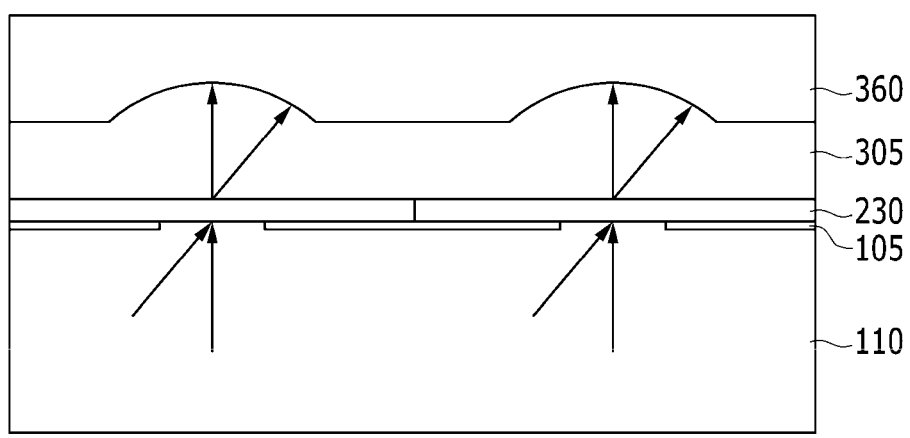
FIG. 12 illustrates a cross section of the display device according to another exemplary embodiment of the present inventive concept.

FIG. 12 illustrates a cross section of a display device according to another exemplary embodiment of the present inventive concept. Referring to FIG. 12, in the display device according to the exemplary embodiment, a spaced apart curved shaped regions is formed in a partial region of the microcavity, and adjacent curved shaped regions are connected by a flat surface region disposed between the adjacent curved surfaces.

That is, in FIG. 12, as described above, the plurality of separated microcavities having semicircular cross sections is not formed, but one connected microcavity is formed in one pixel.

However, as illustrated in FIG. 12, the curved surface is formed in the part of the microcavity.

Further, the reflective layer 105 is formed between the substrate 110 and the color filter 230, and the description of the reflective layer 105 is the same as described above. Referring to FIG. 12, a curved surface of the microcavity is formed on a region without the reflective layer 105. Accordingly, the light is input to the microcavity only in the region between the reflective layers 105, and the light incident in the reflective layer 105 direction is reflected by the reflective layer 105, but is not incident to the inside of the microcavity 305.

The microcavity on the region without the reflective layer 105 has a curved surface. Accordingly, the light incident between the reflective layers 105 is discharged outside through the curved microcavity, and the proceeding path of the light is further uniformly maintained.

The exemplary embodiment illustrated in FIG. 12 may further include convex lens to improve efficiency of light by reducing light reflected by the reflective layer 105.

Therefore, like another exemplary embodiment described above, the difference in color sense between the side view and the front view may be prevented.

However, in the case of the structure, since one connected microcavity is formed in one pixel, the manufacturing process may be simplified as compared with the above structure. That is, the difference in color sense may be compensated without complexity of the manufacturing process.

As such, in the display device of the present inventive concept, the microcavity filled by the liquid crystal layer is formed on one substrate, and the microcavity has the semicircular cross section which includes semioval cross section to equalize the paths of the light passing through the microcavity. Accordingly, in the case of viewing the display device from the side and viewing the display device from the front, the problem that the difference in color sense due to the path difference of the light may be prevented from occurring.

Figure 13:
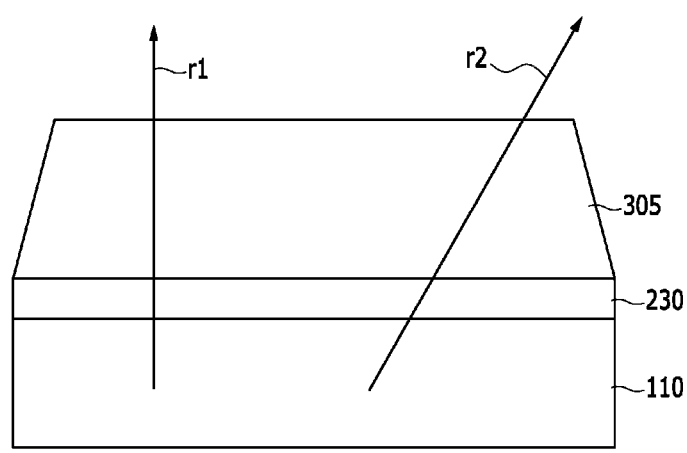
FIG. 13 illustrates a display device according to a Comparative Example of the present inventive concept.

FIG. 13 illustrates a display device according to a comparative example of the present inventive concept. Referring to FIG. 13, in the case of a display device according to the comparative example of the present inventive concept, microcavities 305 have the same quadrangular shape in the entire area of the substrate 110.

Accordingly, as illustrated in FIG. 13, an optical path r2 when viewing the display device from the side is longer than an optical path r1 when viewing the display device from the front.

Since the optical path is longer, when viewing the display device from the side, a screen may be shown to be yellowish as compared with when viewing the display device from the front. That is, the difference in color sense when viewed from the front and the side occurs.

However, in the case of the liquid crystal display according to the exemplary embodiment of the present inventive concept, as described above, since the microcavity has the semicircular shape which includes the semioval shape, the optical paths are the same as or similar to each other at the front and the side. Accordingly, the difference in color sense due to the path difference may be minimized and performance of the display device may be improved.

Next, hereinafter, a manufacturing method of the display device according to the exemplary embodiment of the present inventive concept will be described with reference to FIGS. 14 to 24. FIGS. 14 to 24 are process cross-sectional views illustrating a manufacturing method of the display device according to the exemplary embodiment of the present inventive concept.

Figure 14:
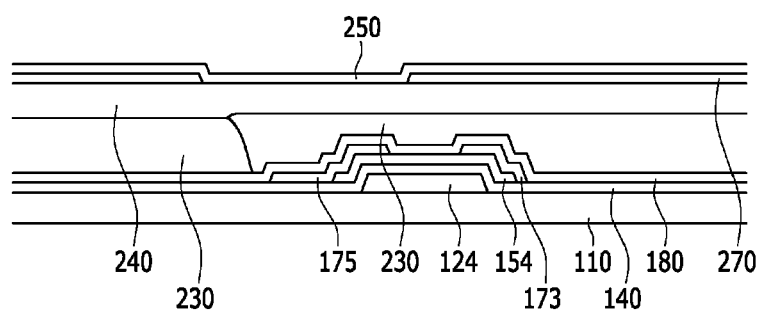
FIGS. 14, 15, 16, 17, 20, 21, 22, 23 and 24 are process cross-sectional views illustrating a manufacturing method of a display device according to another exemplary embodiment of the present inventive concept.

First, as illustrated in FIG. 14, a gate line 121 including a gate electrode 124 is formed on an insulation substrate 110, and a gate insulating layer 140 is formed on the gate line 121. A semiconductor 154, a data line 171 including a source electrode 173, and a drain electrode 175 are formed on the gate insulating layer 140. A passivation layer 180 is formed on the data line 171 and the drain electrode 175.

Next, a color filter 230 is formed in each pixel area PX on the passivation layer 180. The color filter 230 is formed in each pixel area PX, but may not be formed in the first valley V1. Further, the color filters 230 having the same color may be formed in a column direction of the plurality of pixel areas PX. In the case of forming the color filters 230 having three colors, a first color filter 230 may be formed first, and then a second color filter 230 may be formed by shifting a mask. After the second color filter 230 is formed, a third color filter may be formed by shifting the mask.

Next, an organic layer 240 and a common electrode 270 are formed on the color filter 230, and an insulating layer 250 is formed on the common electrode 270 with an inorganic insulating material such as silicon nitride (SiNx) and silicon oxide (SiOx).

Figure 15:
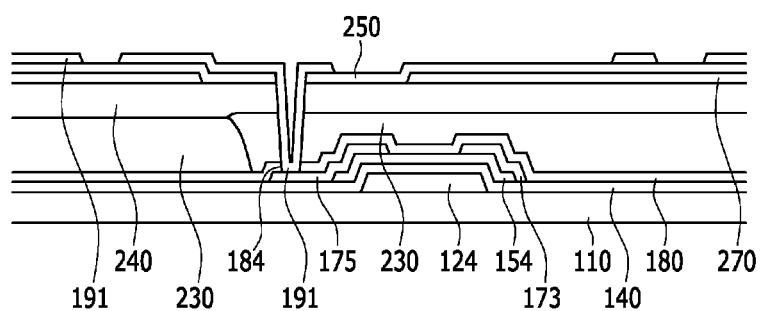

Next, as illustrated in FIG. 15, a contact hole 184 is formed by etching the passivation layer 180, the color filter 230, and the insulating layer 250 so that a part of the drain electrode 175 is exposed.

Subsequently, a pixel electrode 191 is formed in the pixel area PX by depositing and patterning a transparent metal material such as indium tin oxide (ITO) and indium zinc oxide (IZO) on the insulating layer 250. The pixel electrode 191 is formed to be connected with the drain electrode 175 through the contact hole 184.

Figure 16:
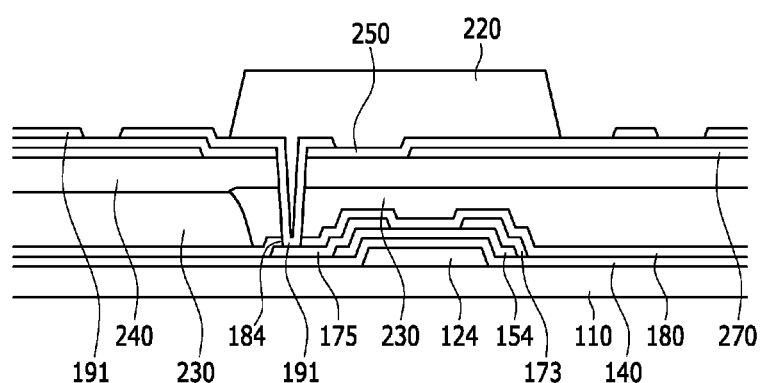

Next, as illustrated in FIG. 16, a light blocking member 220 is formed on the pixel electrode 191 and the insulating layer 250, and positioned on the boundary of each pixel area PX and the thin film transistor region. That is, the light blocking member 220 may be formed in the first valley V1. Further, the light blocking member 220 may be formed even at one edge of each pixel area PX.

Hereinabove, it is described that the light blocking member 220 is formed after forming the color filters 230, but the present inventive concept is not limited thereto, and the light blocking member 220 is formed first and the color filters 230 may be formed later.

Figure 17:
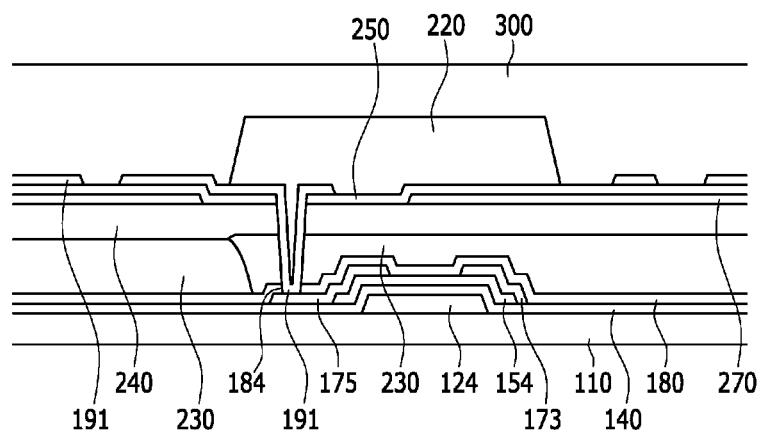

Next, as illustrated in FIG. 17, a sacrificial layer 300 is formed by coating a photosensitive organic material on the pixel electrode and performing a photolithography process.

Figure 18:
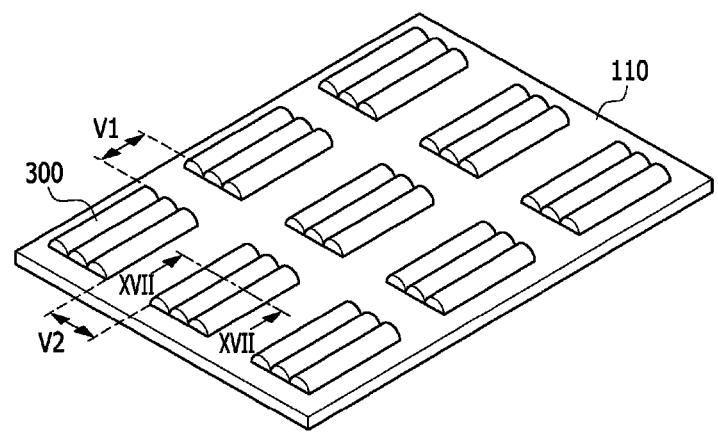
FIG. 18 illustrates a sacrificial layer patterned in the manufacturing process.

FIG. 18 illustrates the sacrificial layer 300 formed through the above process.

Referring to FIG. 18, the sacrificial layer 300 is formed to cover each pixel area PX and removed in the first valley V1 and the second valley V2.

Referring to FIG. 18, the sacrificial layer 300 has a semicircular cross section in a first valley direction and extends in the second valley direction. The sacrificial layer 300 has a plurality of semicylindrical shaped bar arranged in one direction having a cut surface face the substrate direction.

Figure 19:
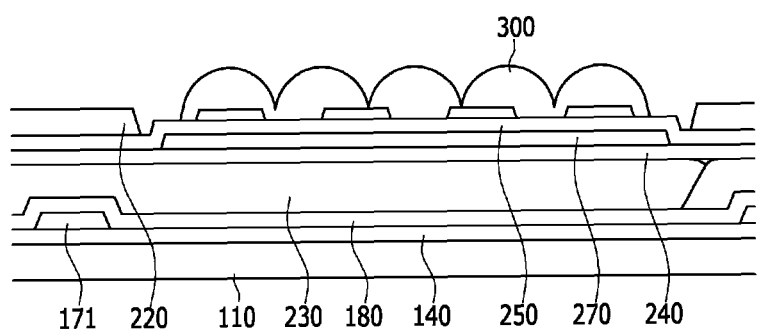
FIG. 19 is a cross-sectional view of the display device of FIG. 18 taken along line XVIII-XVIII.

FIG. 19 is a cross-sectional view of the display device FIG. 18 taken along line XVIII-XVIII. As illustrated in FIG. 19, the sacrificial layer is patterned to have a semicircular cross section in the extending direction of the gate line.

Figure 20:
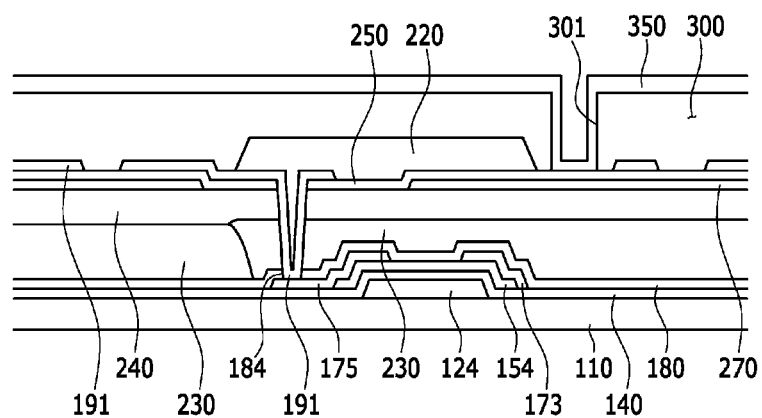

Next, as illustrated in FIG. 20, a lower insulating layer 350 may be formed on the sacrificial layer 300 with an inorganic insulating material such as silicon oxide and silicon nitride.

Figure 21:
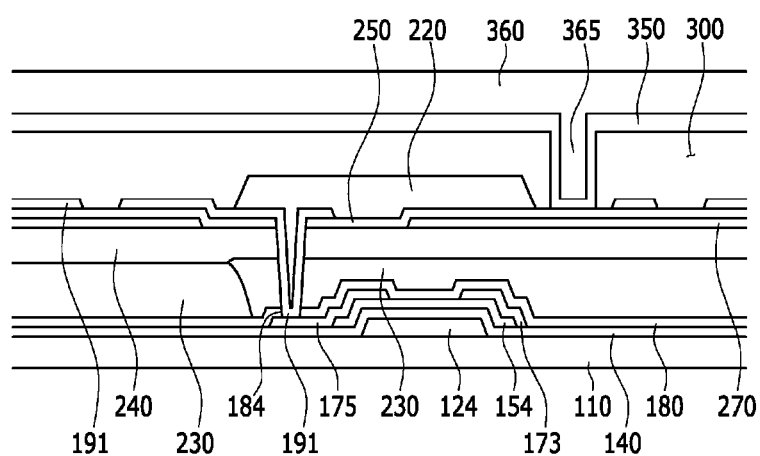

Next, as illustrated in FIG. 21, a roof layer 360 and a supporting member 365 is formed on the lower insulating layer 350 with an organic material. The roof layer 360 and the support member 365 may be formed by using the same material during the same process.

The lower insulating layer 350 may be positioned below the roof layer 360 and the support member 365.

The support member 365 has a column shape, and the planar shape of the support member 365 viewed from the upper side of the substrate 110 may have various shapes such as a circle, a quadrangle, and a triangle.

Figure 22:
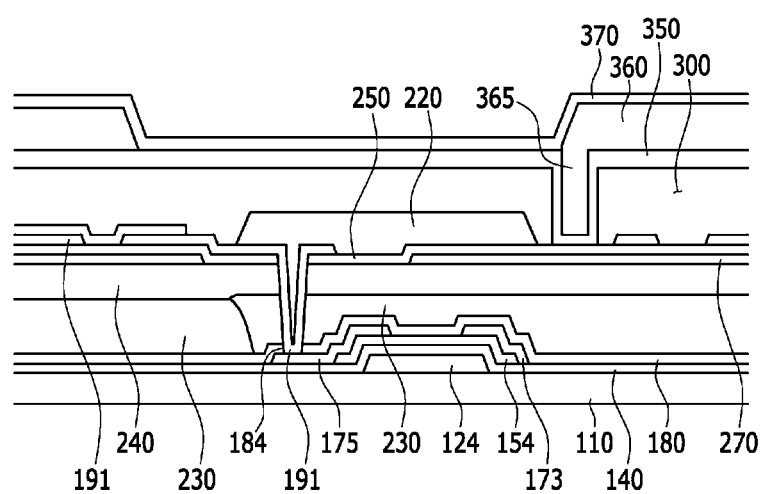

As illustrated in FIG. 22, the roof layer 360 disposed in the first valley V1 may be removed by patterning the roof layer 360. As a result, the roof layers 360 may be formed to be connected to each other along a plurality of pixel rows.

Next, an upper insulating layer 370 may be formed on the roof layer 360 with an inorganic insulating material such as silicon nitride (SiNx) and silicon oxide (SiOx). The upper insulating layer 370 is formed on the patterned roof layer 360 to cover and protect the side of the roof layer 360.

Figure 23:
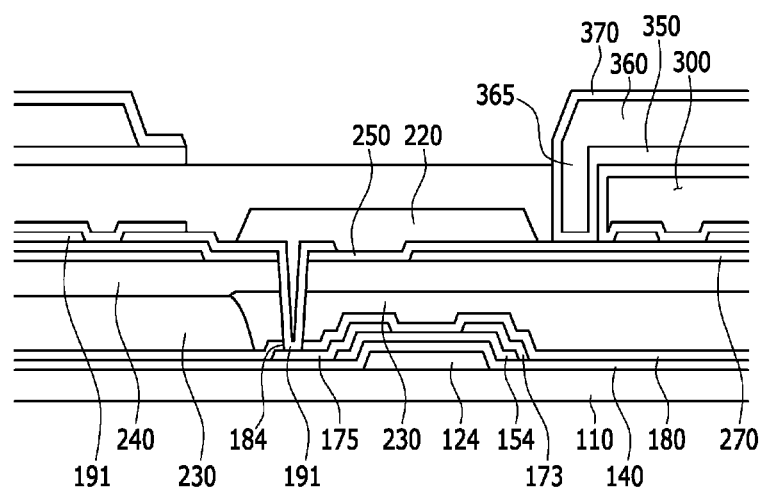

Next, as illustrated in FIG. 23, the upper insulating layer 370 and the lower insulating layer 350 positioned in the first valley V1 are removed by patterning the upper insulating layer 370 and the lower insulating layer 350.

As such, the sacrificial layer 300 positioned in the first valley V1 is exposed to the outside by patterning the upper insulating layer 370 and the lower insulating layer 350.

Subsequently, the sacrificial layer 300 is fully removed by supplying a developer on the substrate 110 where the sacrificial layer 300 is exposed, or the sacrificial layer 300 is fully removed by using an ashing process.

When the sacrificial layer 300 is removed, the microcavity 305 is formed at a location where the sacrificial layer 300 has been positioned.

The pixel electrode 191 and the roof layer 360 are spaced apart from each other with the microcavity 305 therebetween. The roof layer 360 is formed to cover an upper surface, both sides of the microcavity 305, and an opposite surface facing the injection hole.

The microcavity 305 is exposed outside through a portion where the roof layer 360 is removed, which is called an injection hole 307. The injection holes 307 are formed along the first valley V1. For example, the injection hole 307 may be formed at any one of the edges of the pixel area PX. That is, the injection hole 307 may be formed so as to expose the side of the microcavity 305 to correspond to either the upper edge or the lower edge of the pixel area PX. Unlike this, the injection holes 307 may also be formed along the second valley V2.

The support member 365 is adjacent to the injection hole 307 to be formed in the microcavity 305. One injection hole 307 may be formed in one microcavity 305, and the support member 365 is formed to correspond to a position where one injection hole 307 is formed. That is, when the injection hole 307 is formed to correspond to the lower edge of the microcavity, the support member 365 may be formed to correspond to the upper edge of the microcavity and vice versa.

Next, the roof layer 360 is cured by applying heat to the substrate 110. This is to maintain the shape of the microcavity 305 by the roof layer 360.

Figure 24:
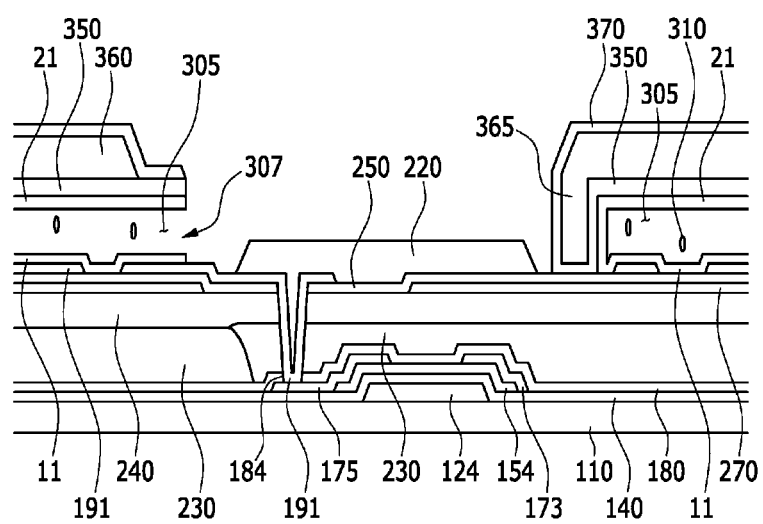

As illustrated in FIG. 24, when an aligning agent including an alignment material is dropped on the substrate 110 by a spin coating method or an inkjet method, the aligning agent is injected into the microcavity 305 through the injection hole 307. When the alignment agent is injected into the microcavity 305 and then a curing process is performed, a solution is evaporated and the alignment material remains on the inner wall of the microcavity 305.

Accordingly, the first alignment layer 11 may be formed on the pixel electrode 191, and the second alignment layer 21 may be formed below the lower insulating layer 350. The first alignment layer 11 and the second alignment layer 21 are formed to face each other with the microcavity 305 therebetween and connected to each other at the edge of the pixel area PX.

The first and second alignment layers 11 and 21 may be aligned in a vertical direction to the substrate 110, except for the side of the microcavity 305. In addition, by performing a process of irradiating UV rays to the first and second alignment layers 11 and 21, the first and second alignment layers 11 and 21 may be aligned in a horizontal direction to the substrate 110.

Next, the overcoat 390 is formed by depositing a material which does not react with the liquid crystal molecules 310 on the upper inorganic layer 370. The overcoat 390 is formed to cover the injection hole 307 where the microcavity 305 is exposed to the outside to seal the microcavity 305.

Next, although not illustrated, polarizers may be further attached onto the upper and lower surfaces of the display device. The polarizers may include a first polarizer and a second polarizer. The first polarizer may be attached onto the lower surface of the substrate 110, and the second polarizer may be attached onto the overcoat 390.

As such, in the display device and the manufacturing method of the present inventive concept, the microcavity filled by the liquid crystal layer is formed to have the semicircular cross section which includes the semioval cross section, and as a result, the paths of the light at the front and the side are equalized and the problem that the difference in color sense at the front view and the side view may be prevented.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device, comprising:
an insulation substrate;
a thin film transistor disposed on the substrate;
a pixel electrode disposed on the thin film transistor;
a roof layer formed to be spaced apart from the pixel electrode with a microcavity therebetween and including a support member; and
a liquid crystal layer filling the microcavity,
wherein the microcavity includes a plurality of microcavities having a semicircular cross section arranged along an extending direction of the gate line and extending in the extending direction of the data line.

2. The display device of claim 1, wherein:
the plurality of microcavities are not connected with adjacent microcavities.

3. The display device of claim 1, wherein:
in the plurality of microcavities, a ratio of a height and a width of each microcavity is about 1:2 to about 1:3.

4. The display device of claim 1, wherein:
a height of each of the plurality of microcavities is about 3 μm to about 5 μm.

5. The display device of claim 1, wherein:
a width of each of the plurality of microcavities is about 6 μm to about 15 μm.

6. The display device of claim 1, further comprising:
color filters formed between the thin film transistor and the pixel electrode,
wherein the color filters of red, green, blue, and white are alternately formed with respect to each pixel electrode.

7. The display device of claim 6, wherein:
the microcavity disposed on the pixel electrode with the red, green, and blue color filters has a single space separated for each pixel electrode and has a quadrangular cross section, and
the microcavity including the plurality of microcavities having a semicircular cross section is a white subpixel.

8. The display device of claim 1, further comprising:
a reflective layer having a plurality of openings corresponding to centers of the plurality of microcavities disposed on a surface of the insulation substrate.

9. The display device of claim 1, further comprising:
a plurality of lenses having a same width as each of the plurality of microcavities disposed on a lower surface of the insulation substrate.

10. The display device of claim 1, wherein:
a cross section in the gate line direction of the microcavity has a plurality of semicircular shapes spaced apart from each other and adjacent curved surfaces are connected by a flat surface disposed between the adjacent curved surfaces.

11. The display device of claim 10, wherein: the microcavity has a single space in the one pixel electrode.

12. The display device of claim 10, further comprising:
a reflective layer having a plurality of openings corresponding to a center of a region where each semicircular shape is formed, the reflective layer being disposed on a surface of the insulation substrate.

* * * * *